United States Patent [19]

Crosby et al.

[11] 3,925,435

[45] Dec. 9, 1975

[54] PRODUCTION OF ISOCYANATES

[75] Inventors: John Crosby; Robert Michael Paton; Robert Allan Campbell Rennie, all of Runcorn, England

[73] Assignee: Imperial Chemical Industries Limited, London, England

[22] Filed: July 5, 1973

[21] Appl. No.: 376,298

[30] Foreign Application Priority Data
July 21, 1972 United Kingdom............ 34203/72

[52] U.S. Cl. .................... 260/453 P; 260/307 G
[51] Int. Cl.² ...................................... C07C 118/00
[58] Field of Search................................ 260/453 P

[56] References Cited
UNITED STATES PATENTS

| | | | |
|---|---|---|---|
| 3,275,618 | 9/1966 | Tilley et al. | 260/453 X |
| 3,275,669 | 9/1966 | Ulrich | 260/453 |

*Primary Examiner*—Lewis Gotts
*Assistant Examiner*—Dolph H. Torrence
*Attorney, Agent, or Firm*—Cushman, Darby & Cushman

[57] ABSTRACT

A process for the production of isocyanate by thermal decomposition of a dialiphatic substituted furoxan. Preferably the furoxan is derived from a cyclic olefin and the product is an aliphatic diisocyanate.

12 Claims, 1 Drawing Figure

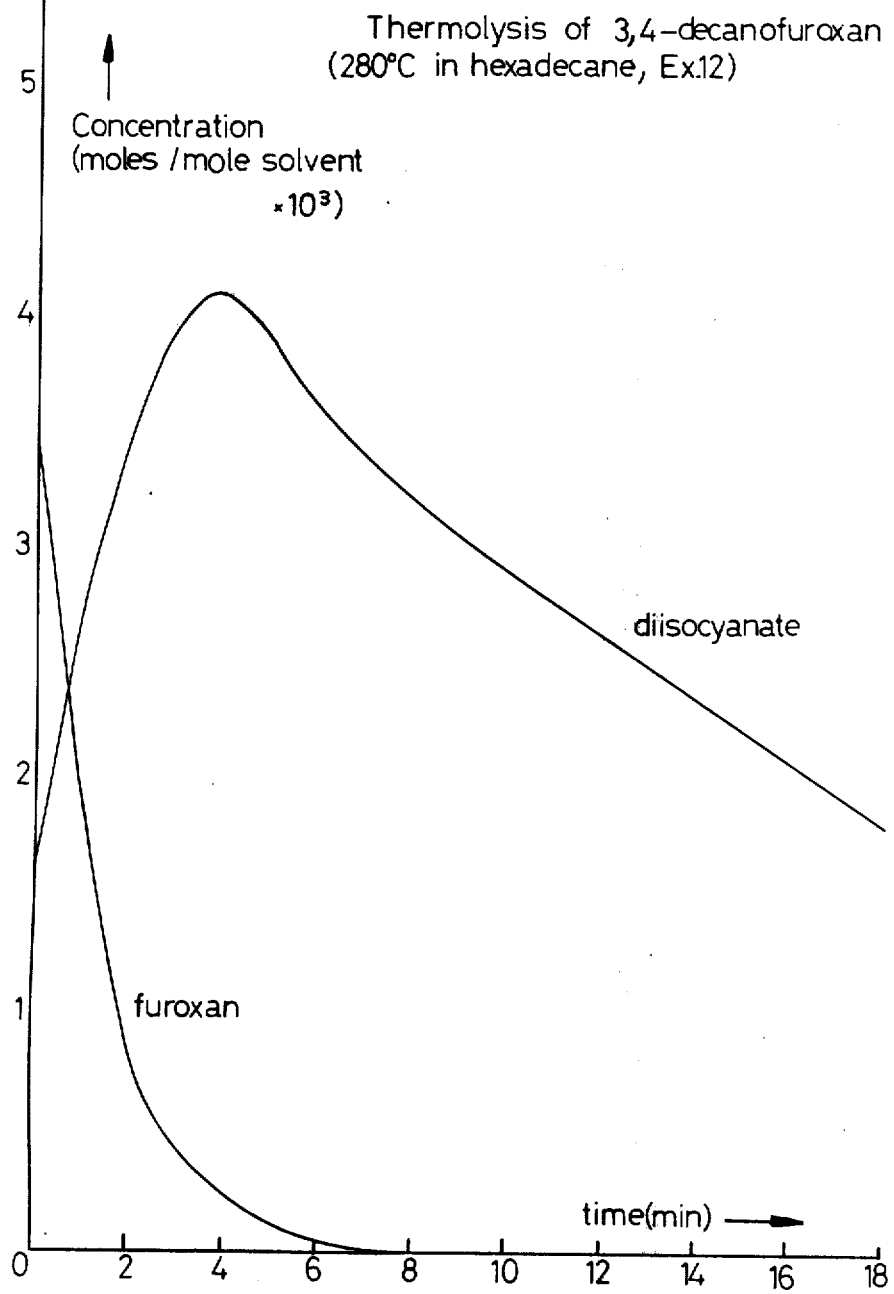

PRODUCTION OF ISOCYANATES

This invention relates to the production of isocyanates and preferably, but not exclusively, to the production of aliphatic polyfunctional isocyanates, that is compounds containing two or more isocyanate groups in the molecule. Such compounds are useful, for example, in the production of plastics, for example, polyurethanes.

According to one aspect of the present invention, we provide a process for the preparation of isocyanates by thermal decomposition of a furoxan each ring carbon atom of which is substituted by a group in which the atom directly linked to the furoxan ring is an aliphatic carbon atom as herein defined.

Suitable furoxan starting materials include those of general formula:

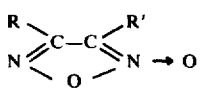

where R and R', which may be the same or different, are separate groups in each of which the atom directly linked to the furoxan ring is an aliphatic carbon atom as herein defined. Alternatively, R and R' may be linked one to another as part of an aliphatic second ring system (the first ring system being the furoxan ring). This second ring system may itself be part of a multiple ring system.

An aliphatic carbon atom is defined as a carbon atom which is not a member of an aromatic ring system.

As described below, these furoxans may be made to undergo a thermal decomposition and rearrangement to form an isocyanate or a mixture of isocyanates on heating either alone or, preferably, in solution in an inert solvent. An inert solvent is defined as a solvent which will not, at the temperature of the ring-opening reaction, decompose or react at a significant rate with the furoxan, the product isocyanate, or any reaction intermediates. The product isocyanate may then be recovered by conventional means, for example by removal of the solvent by distillation.

In general, however, the product isocyanate may itself react further on heating, for example by dimerization or trimerization of isocyanate groups, and in a batch process the concentration of product isocyanate may decrease after a certain time.

This is shown in FIG. 1, in which the concentration of the reactant furoxan and product isocyanate in a typical reaction according to the invention are plotted against time.

For this reason it is important that the product isocyanate should not remain for long periods of time in the heated reaction zone. In a batch process the reactant solution may be heated rapidly to the reaction temperature, held there for the optimum time and then the reaction mixture quenched by rapid cooling, but this is inconvenient on a large scale, and it is particularly preferred that the product isocyanate is removed from the reaction zone substantially as it is formed.

If the product isocyanate is sufficiently volatile, such removal may conveniently be accomplished by distillation of the product from the reaction zone. This may be convenient for example in the preparation of low molecular weight monoisocyanates, for example methyl isocyanate.

However, distillation of the product isocyanate may not always be practicable, particularly when the product is a diisocyanate, and other means of removing it from the reaction zone must then be employed.

A preferred mode of operation consists of a process whereby the reactant furoxan flows through the heated reaction zone in a fluid stream, and the product isocyanate is continually swept out of the reaction zone by the fluid stream. The reactants and the product may be in the form of their vapours, the fluid stream comprising the reactant and product vapours and optionally an inert diluent gas. Optionally the gaseous fluid stream may be at a pressure lower than 1 atmosphere to facilitate volatilisation of reactant and product.

Preferably, however, the fluid stream comprises a solution of reactant and product in an inert solvent as hereinbefore defined. The stream enters the reaction zone as a solution of the furoxan reactant, and the temperature and residence time of the stream in the reaction zone are selected so as to optimise the yield and/or conversion of the process. The stream leaves the reaction zone as a solution substantially of the product isocyanate, which may be quenched by rapid cooling to prevent further reaction of the isocyanate.

An alternative, less preferred, method of operation comprises including in the system a compound, hereinafter referred to as a trapping agent, which will react rapidly with the product isocyanate to form what may be referred to as a secondary product. Once the decomposition of the furoxan has been completed, the isocyanate may then be regenerated from the secondary product. Optionally the secondary product is isolated and purified before regeneration of the isocyanate.

Particularly convenient trapping agents are hydroxylic compounds, particularly high boiling alcohols and phenols. Conveniently, if the boiling point of the hydroxylic compound is high enough, it is used as the solvent for the thermal decomposition of the furoxan. A co-solvent may be employed if desired.

Other trapping agents include amines; substituted phenols, for example p-nitrophenol; and mineral acids, for example, anhydrous hydrogen chloride.

The trapping agent is preferably such that the isocyanate can readily be regenerated from the secondary product. For example, if a hydroxylic compound has been employed, the isocyanate may be regenerated by thermal decomposition of the resultant urethane.

The temperature at which the isocyanate is produced at a reasonable rate will depend on the structure of the furoxan, but will normally be in the range 100° to 350°C. Conveniently, the furoxan is dissolved in a solvent, and the boiling point of the solution is so chosen that the reaction can be carried out at reflux temperature. Suitable inert solvents (or co-solvents) having boiling points in the appropriate temperature range are o-dichlorobenzene (boiling point 179°C), 1,2,4-trichlorobenzene (boiling point 213.5°C), 1,2,4,5-tetrachlorobenzene (boiling point 244°C) and hexadecane (boiling point 287°C). As indicated above, the solvent may include or consist of a compound which will react rapidly with the isocyanate and remove it from the reaction zone. Suitable hydroxylic compounds include n-octanol (1-octanol) (boiling point 194°C), n-decanol (1-decanol) (boiling point 229°C), p-cresol (boiling point 202°C), and p-tert-butylphenol (boiling point 237°C).

When the process is carried out in a fluid stream, the stream may enter and leave a heated vessel constituting the reaction zone, in which the solvent or co-solvent may be under reflux. Alternatively, the flow may pass through a closed system for example a tube surrounded by a heating medium, in which case the solvent or co-solvent will not be under reflux and selection of a suitable boiling point is less critical. A convenient high-boiling solvent is n-hexadecane.

It may be advantageous in such a system to use a solvent boiling below the reaction temperature, keeping the solution under pressure while in the reaction zone, then allowing the solvent to flash distil by releasing the pressure, for example by allowing the solution to escape from the reaction zone through a fine nozzle. In this way the solution will be cooled and the product isocyanate concentrated in a single step.

The structure of the furoxan will vary according to the structure of the isocyanate which it is desired to produce. If the groups R and R' are not linked one to another the product will be a mono-isocyanate. It will be apparent that, if the groups R and R' are different, then the product will be a mixture of two isocyanates of formulae $$R - N = C = O \text{ and } R' - N = C = O$$

While the production of such a mixture is within the scope of our invention, it may be preferable for R and R' to be identical, giving rise to a single mono-isocyanate.

Suitable groups R and R' include $C_{1-18}$ hydrocarbyl groups, for example straight or branched chain alkyl or cycloalkyl groups. The groups R and R' may bear substituents including alkoxy and aryl groups and halogen atoms.

It is preferred that R and R' are linked one to another, forming an alicyclic ring system fused to the furoxan ring. A particularly preferred class of starting materials are the furoxans of general formula:

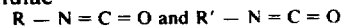

where $n$ is an integer of at least 3, preferably 3 to 30, more preferably 3 to 20 and particularly 4 to 10.

On heating as described, these furoxans give rise to di-isocyanates of formula $$O = C = N - CH_2 + CH_2)_{n-2} CH_2 - N = C = O$$

A convenient route for preparing suitable alicyclic furoxans involves addition of dinitrogen trioxide to a cyclic olefin to give the pseudonitrosite (nitronitroso dimer), which can then be cyclised with loss of water to give the furoxan.

Dinitrogen trioxide, in the form of a premixed stream of nitric oxide and air, is bubbled through a vigorously stirred solution of the olefin in a saturated hydrocarbon-ether mixed solvent, the temperature being maintained between $-10°$ and $+10°C$. The solid pseudonitrosite formed is separated by filtration and washed, and then converted to the furoxan, either directly, or in two stages via a nitrooxime intermediate.

Direct conversion to the furoxan is achieved by heating the pseudonitrosite in the presence of a dehydrating agent such as sulphuric acid or polyphosphoric acid at $100°$ to $120°C$. After dilution with water, the product can be extracted with ether and purified by recrystallisation.

Alternatively the pseudonitrosite can be converted in high yield to the 2-nitroalkanone oxime by heating to $100°$ to $120°C$ in a suitable polar solvent such as dioxane or dimethylformamide until the blue/green coloration of the nitronitroso monomer disappears: removal of the solvent leaves the nitrooxime which can then be converted to the furoxan by heating in the presence of a dehydrating agent such as sulphuric acid.

The furoxan need not be isolated, but may be converted directly to the isocyanate.

Such a reaction scheme may be represented as follows:

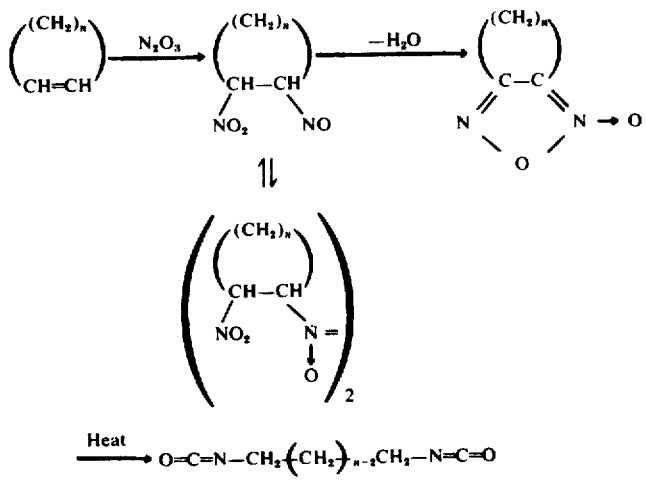

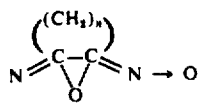

The methylene groups in the above structures may be unsubstituted, as shown, or may include substituent atoms or groups in place of the hydrogen atoms, provided that such substituents do not react with the dinitrogen trioxide or interfere, sterically or otherwise, with the subsequent reactions. Substituents will carry through to the product isocyanate and will be chosen according to the desired structure of the isocyanate. Certain substituents, for example, sterically hindered groups inducing strain in the alicyclic ring, may aid the production of the isocyanate.

As described above, the isocyanate is preferably removed from the reaction zone substantially as it is formed, for example, by carrying out the thermal decomposition of the furoxan in a fluid stream comprising a solution of the furoxan in an inert solvent.

Thus, according to another aspect of the present invention, we provide a process for the production of aliphatic diisocyanates which comprises
 a. adding dinitrogen trioxide to a cyclic olefin to form the pseudonitrosite,
 b. converting the pseudonitrosite to a carbocyclic furoxan, and
 c. heating the furoxan, preferably in a fluid stream comprising a solution of the furoxan in an inert solvent.

Alternatively, the alicyclic ring system fused to the furoxan ring may itself be part of an additional ring system. This additional ring system may contain aromatic rings, provided that the ring system directly fused to the furoxan ring is aliphatic. These furoxans may be considered as formally derived from a polycyclic olefin by addition of dinitrogen trioxide across the olefinic double bond.

Suitable formal starting materials thus include: norbornene

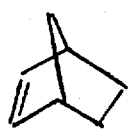

and 1,4-dihydronaphthalene

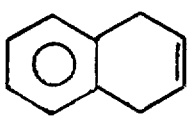

For example, the furoxan formally derived from norbornene has the structure:

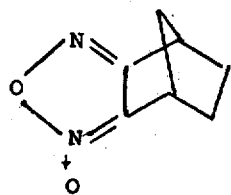

If the isocyanate is removed from the reaction zone by reaction with a trapping agent, the secondary product thus produced may itself be a useful material, in which case regeneration of the isocyanate from the secondary product may be omitted.

The invention is now illustrated by the following Examples, in which parts by weight and parts by volume bear the same relation as do kg and dm³. Yields are mole %, calculated on the basis of the theoretical yield of product.

EXAMPLE 1

Preparation of cyclododecene pseudonitrosite

A stirred solution of cyclododecene (166 parts by weight) in 1:1 hexane-ether solution (500 parts by volume) at 0°C was treated with a premixed stream of nitric oxide (80 parts by volume/min) and air (40 parts by volume/min). After a few minutes white crystals of the pseudonitrosite precipitated from the pale green solution. Completion of the reaction was indicated by the appearance of a brown gas above the surface of the reaction, showing that oxides of nitrogen were no longer being absorbed. The crystalline product was separated by filtration, washed with ether and air-dried. After recrystallisation from methylene chloride-petrol, cyclododecene pseudonitrosite was isolated in 61% yield.

EXAMPLE 2

Preparation of 2-nitrocyclodecanone oxime

Cyclododecene pseudonitrosite (25.0 parts by weight), prepared as in Example 1, was dissolved in dioxane (100 parts by volume) and was refluxed under nitrogen until the blue/green colour of the nitroso monomer had completely disappeared (1–2 hours), leaving a yellow solution. Removal of the solvent by evaporation left 20.5 parts by weight (82% yield) of 2-nitrocyclododecanone oxime as a yellow oil which solidified on standing or on trituration with ether.

EXAMPLE 3

Preparation of 3,4-decanofuroxan from the oxime

The crude reaction product of Example 2 (10.0 parts by weight) was added slowly to ice-cooled 70% sulphuric acid (50 parts by volume). The mixture was immersed in a bath at 110°C for 10 minutes. After cooling, the solution was poured onto an ice-water mixture, when a pale brown solid was formed. This solid was dissolved in ether and the ethereal solution washed with aqueous sodium carbonate and then with water. After drying the solution with anhydrous magnesium sulphate and removal of the solvent by evaporation under reduced pressure, the pale brown crystals were recrystallised from ethanol, decolorised by refluxing in ether in the presence of activated charcoal, and finally recrystallised again from ethanol to give 5.9 parts by weight (64% yield) of 3,4-decanofuroxan.

EXAMPLE 4

3,4-decanofuroxan from the pseudonitrosite

Cyclododecene pseudonitrosite (5.0 parts by weight) was dissolved in concentrated sulphuric acid (5 parts by volume) and the solution added slowly to concentrated sulphuric acid (10 parts by volume) at 120°C. The mixture was kept at this temperature for 30 minutes and, after cooling, was poured onto ice and water. The product was extracted with ether and the ethereal layer was washed with base and water and then dried. After removal of the solvent, the solid residue was purified by recrystallisation and activated charcoal treatment as described in Example 3 to yield 2.6 parts by weight (56% yield) of 3,4-decanofuroxan. Other carbocyclic furoxans could be prepared in a similar manner.

EXAMPLE 5

Reaction of 3,4-dimethylfuroxan 3,4-Dimethylfuroxan (5.0 parts by weight) was heated under reflux using an air condenser. The methyl isocyanate produced during this pyrolysis passed through the condenser to a cold trap from which 2.8 parts by weight (56% yield) of the isocyanate was collected. The product was identified by comparison of its infra-red spectrum with that of authentic material and by the formation of N-methyl-N'-phenylurea by reaction with aniline.

EXAMPLE 6

Reaction of 3,4-butylmethylfuroxan 3,4-Butylmethylfuroxan (5.0 parts by weight), prepared from hept-2-ene and dinitrogen trioxide as described in Examples 1, 2 and 3 was heated to 260° in a falling film distillation apparatus. The products of the pyrolysis were separated by fractionation to give methyl isocyanate (1.1 parts by weight, 60% yield) and butyl isocyanate (1.8 parts by weight, 57%), which were identified as their urea derivatives by reaction with aniline.

EXAMPLE 7

Reaction of 3,4-diheptadecylfuroxan 3,4-Diheptadecylfuroxan (5.0 parts by weight) was dissolved in 1,2,4,5-tetrachlorobenzene (25.0 parts by weight) and the solution was heated under reflux for 15 minutes. The solvent was removed by distillation at reduced pressure and the residue was shown to contain heptadecyl isocyanate by infra-red spectroscopy and by the preparation of 2.4 parts by weight (43% yield) of the methyl carbamate derivative.

EXAMPLE 8

Reaction of 3,4-decanofuroxan with trapping agent

A solution of 3,4-decanofuroxan (10.0 parts by weight) in n-decanol (60 parts by weight) was heated under reflux for 1 hour. On cooling, a white solid was formed, which, after separation by filtration and recrystallisation from ethanol, was shown to be the bis-carbamate derived from decamethylene diisocyanate and n-decanol. The product was isolated in 70% yield and was identified by infra-red, nuclear magnetic resonance and mass spectral techniques.

EXAMPLE 9

Reaction of 3,4-dimethylfuroxan with trapping agent

A solution of 3,4-dimethylfuroxan (1.0 parts by weight) in n-dodecanol (5.0 parts by weight) was added dropwise to refluxing n-dodecanol (10.0 parts by weight), and the mixture was maintained under reflux for a further one-fourth hour. After cooling and removal of the solvent by vacuum distillation, the residue was dissolved in chloroform and purified by chromatography on silica gel using chloroform as eluant. The solid thus obtained was identified as dodecyl N-methylcarbamate (2.5 parts by weight, 59% yield) by its m.p. (54.5°–55.0°C) and mixed m.p. (54.0°–55.0°C) with an authentic sample, prepared from methyl isocyanate and n-dodecanol.

EXAMPLE 10

Formation of methyl isocyanate from 3,4-dimethyl furoxan via a trapping agent

A solution of 3,4-dimethylfuroxan (1.0 parts by weight) in diphenylamine (15 parts by weight) was heated for 30 minutes at 195°C. The excess diphenylamine was removed by distillation under high vacuum and the N,N-diphenyl-N'-methylurea remaining was purified by recrystallisation from ethanol. On heating the purified urea to 260°C methyl isocyanate was evolved and collected in a cold trap, leaving regenerated diphenylamine in the reaction vessel. The methyl isocyanate produced (0.2 parts by weight, 20% yield) was identified as described in Example 5 by formation of its phenyl urea adduct.

EXAMPLE 11

Reaction of 3,4-decanofuroxan

A solution of 3,4-decanofuroxan (1.0 parts by weight) in n-hexadecane (15.5 parts by weight), contained in a round-bottom flask fitted with a thermometer, was immersed in a Woods metal bath, which was supplied with sufficient heat for the temperature of the solution to rise to 280°C over a period of 1 minute, and then to be maintained at that temperature for a further 1 minute. The solution was then rapidly cooled, after which ethanol (3.0 parts by weight) and triethylamine (0.1 parts by weight) were added. After heating this mixture for one hour under reflux, the excess ethanol and the bulk of the solvent were removed by distillation, first at atmospheric pressure and then under vacuum. Chromatography of the residue on silica gel using chloroform as eluant yielded a white solid, which was identified as the bis-carbamate derived from decamethylene diisocyanate and ethanol by its i.r. n.m.r. and mass spectra, and by its m.p. and mixed m.p. (89°–90°C) with an authentic sample.

EXAMPLE 12

Reactions of 3,4-decanofuroxan

Solutions of 3,4-decanofuroxan (1.0 part by weight) in hexadecane (154 parts by weight) were heated up to 280°C during 1 minute as described in Example 11, held at 280°C for periods of time (the reaction time) varying from zero to 18 minutes, and then rapidly cooled. The resulting solutions were analysed for the furoxan reactant and decamethylene diisocyanate product by infra-red spectroscopy.

Table I shows the concentrations found after the reaction times specified as well as the % conversion and the % yield.

The concentrations of reactant and product are depicted graphically in FIG. 1.

TABLE 1

| reaction time in minutes | [furoxan]×10³ in moles/mole solvent | [diisocyanate]×10³ in moles/mole solvent | % conversion | % yield |
|---|---|---|---|---|
| 0 | 3.43 | 1.70 | 47 | 55 |
| 0.5 | 2.41 | 2.50 | 62 | 61 |
| 1 | 1.89 | 2.76 | 71 | 60 |
| 1.75 | 1.08 | 3.48 | 83 | 64 |
| 3 | 0.46 | 3.98 | 93 | 66 |
| 4.5 | 0.13 | 3.98 | 98 | 62 |
| 6 | 0.04 | 3.56 | 99 | 55 |
| 8 | 0 | 3.20 | 100 | 49 |
| 18 | 0 | 1.80 | 100 | 28 |

EXAMPLE 13

Reaction of 3,4-decanofuroxan in liquid stream

A solution of 3,4-decanofuroxan (1.0 parts by weight) in n-hexadecane (15.5 parts by weight) was passed through a glass tube coil immersed in a Woods metal bath at 250°C, a continuous flow being maintained using a syringe pump. After cooling to room temperature, the reaction mixture was analysed by infra red spectroscopy using a cell incorporated into the flow apparatus.

The pump rate was adjusted so as to provide a reaction time of 10 minutes for the furoxan solution in contact with the heating bath. Under these conditions the yield of diisocyanate was 46 at 72% conversion.

What we claim is:

1. A process for the preparation of mono- or di-isocyanates in which a furoxan of general formula

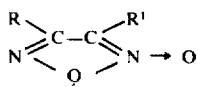

where R and R¹, which may be the same or different, represent aliphatic hydrocarbyl groups containing from 1 to 18 carbon atoms which may bear alkoxy groups, aryl groups or halogen atoms as substituents, and may be linked one to another to form a ring system which may contain both aliphatic and aromatic components, provided that that part of said ring which is fused directly to the furoxan ring is aliphatic, is heated to a temperature at which the furoxan ring is opened to produce at least one mono-isocyanate when R and R¹ are separate groups or a di-isocyanate when R and R¹ are linked.

2. A process for the preparation of aliphatic diisocyanates according to claim 1 in which the furoxan has the general formula

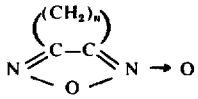

where $n$ is an integer of from 3 to 30.

3. A process according to claim 2 where $n$ is from 4 to 10.

4. A process according to claim 1 in which the furoxan is heated in an inert solvent.

5. A process according to claim 1 in which the product isocyanate is removed from a zone in which the furoxan ring is opened substantially as it is formed.

6. A process according to claim 5 in which the reactant furoxan flows through said zone in a fluid stream which removes the product isocyanate.

7. A process according to claim 6 in which the fluid stream comprises a solution of the furoxan in an inert solvent.

8. A process according to claim 5 in which the product isocyanate is removed from said zone by reaction with a trapping agent to form a secondary product from which the isocyanate is subsequently regenerated.

9. A process according to claim 8 in which the trapping agent is used as a solvent for the furoxan.

10. A process for the preparation of aliphatic di-isocyanates according to claim 2, comprising the steps of
   a. bubbling dinitrogen trioxide, in the form of a mixture of nitric oxide and air, through a vigorously stirred solution of a cyclic olefin in a saturated hydrocarbon/ether mixed solvent to form a pseudonitrosite,
   b. cyclising the pseudonitrosite by heating it to 100°–120°C in the presence of a dehydrating agent to remove water and form a furoxan, and
   c. heating the furoxan, in solution in an inert solvent, to a temperature at which the furoxan ring is broken to produce a di-isocyanate.

11. A process according to claim 10 in which the furoxan is heated in a fluid stream comprising a solution of the furoxan in an inert solvent.

12. A process for the preparation of aliphatic di-isocyanates according to claim 2, comprising the steps of
   a. bubbling dinitrogen trioxide, in the form of a mixture of nitric oxide and air, through a vigorously stirred solution of a cyclic olefin in a saturated hydrocarbon/ether mixed solvent to form a pseudonitrosite,
   b. converting the pseudonitrosite to the 2-nitroalkanone oxime by heating it at 100° to 120°C in a polar solvent, and
   c. removing said solvent and heating the 2-nitroalkanone oxime in the presence of a dehydrating agent to remove water and form a furoxan, and
   d. heating the furoxan, in solution in an inert solvent, to a temperature at which the furoxan ring is broken to produce a di-isocyanate.

* * * * *